Figure 1:
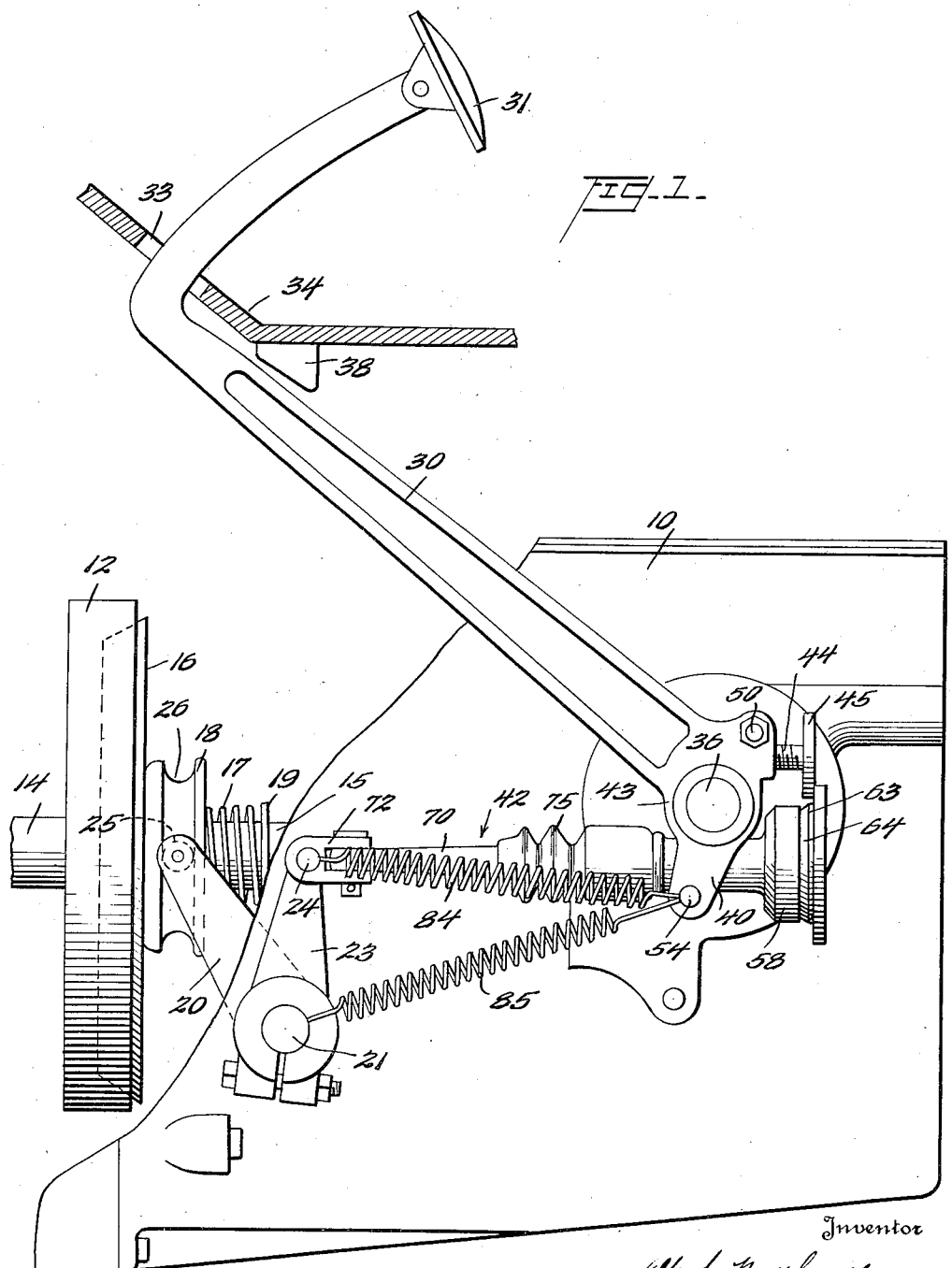

Feb. 23, 1937.  A. MOORHOUSE  2,072,010
AUTOMATIC ADJUSTING DEVICE
Filed Nov. 17, 1931  2 Sheets-Sheet 1

Inventor
Alfred Moorhouse
By Watson, Coit, Morse & Grindle
Attorney

Feb. 23, 1937. A. MOORHOUSE 2,072,010
AUTOMATIC ADJUSTING DEVICE
Filed Nov. 17, 1931 2 Sheets-Sheet 2
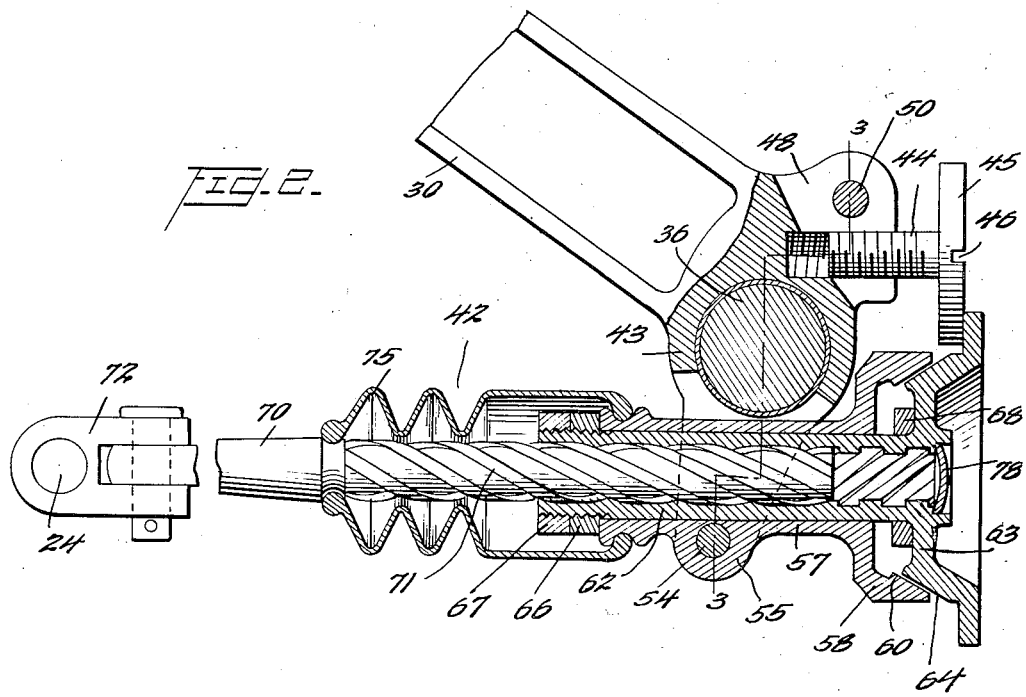
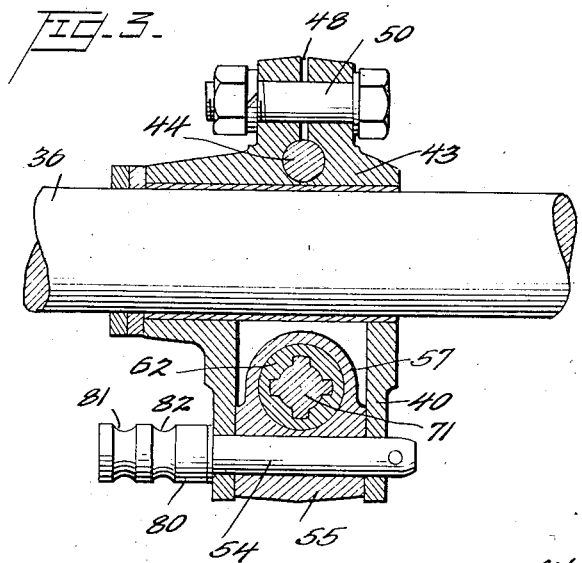
Inventor
Alfred Moorhouse
By Watson, Cost, Morse & Grindle
Attorney Patented Feb. 23, 1937

2,072,010

UNITED STATES PATENT OFFICE 2,072,010

AUTOMATIC ADJUSTING DEVICE

Alfred Moorhouse, Detroit, Mich., assignor to Packard Motor Car Company, Detroit, Mich., a corporation of Michigan Application November 17, 1931, Serial No. 575,668

7 Claims. (Cl. 192—111)

This invention relates to improvements in mechanism for controlling the operation of motor vehicles and in particular the control mechanism for the vehicle clutch.

Clutch operation is ordinarily effected by manipulation of an operating element comprising a pedal projecting through the vehicle floorboard, this pedal being connected with the clutch by linkage whereby depression of the pedal serves to release or disengage the cooperating parts of the clutch to discontinue the drive from the motor to the vehicle wheels. It has heretofore been proposed to provide clutch or brake operating mechanisms with means for taking up slack resulting from wear of the cooperating parts of the linkage connecting the brake or clutch pedal with the operating element. It is found, however, that while it is a relatively simple matter to eliminate lost motion in a control mechanism by suitable slack take-up devices, one of the principal difficulties encountered is due to wear of the cooperating clutch parts, for instance, the friction facings of the clutch. Wear of the clutch facings has the same effect as shortening the linkage connecting the clutch pedal with the movable clutch element and thus the clutch is disengaged by depressing the clutch pedal through a smaller range of movement and on releasing the clutch pedal to engage the clutch, the pedal is caused to rise to a greater extent. Thus, it frequently happens that when the clutch pedal is released it will rise and engage the underside of the floorboard before the cooperating parts of the clutch have firmly engaged, and unnecessary wear of the clutch facings and other difficulties incident to incomplete engagement of the cooperating clutch parts result.

It is therefore a feature of the present invention to provide means whereby the range of movement of the clutch pedal or the position of the clutch pedal when the clutch is engaged to drive the vehicle is not substantially altered as the result of excessive wear of the cooperating clutch parts.

A more specific object of the invention is the provision of means for automatically shortening the effective length of the operative connection between the clutch pedal and the movable portion of the clutch to compensate for wear of the clutch facing.

A further object of the invention is the provision of means whereby the position of the clutch pedal when the clutch parts are engaged may be readily adjusted by hand together with means whereby this adjustment may be maintained automatically during operation of the vehicle regardless of wear incident to such operation.

Further objects and features of the invention will be apparent from the following description taken in connection with the accompanying drawings, in which Figure 1 is a side elevational view of a portion of a motor vehicle illustrating certain clutch controlling mechanism to which the invention has been applied;

Figure 2 is an enlarged view, partly in section, of a portion of the apparatus shown in Figure 1; and Figure 3 is a section on the line 3—3 of Figure 2.

In the specification and the accompanying drawings, a specific embodiment of the invention is disclosed and this embodiment is described in detail. It will, nevertheless, be understood that the primary purpose of thus describing and illustrating the invention by reference to a specific form thereof is to facilitate an understanding of the principles underlying the invention and that the scope of the invention is not intended to be limited thereby.

Referring now to Figure 1 of the drawings, the reference numeral 10 indicates a housing of conventional construction in which the vehicle clutch and associated parts of the vehicle drive are enclosed. A portion of this casing has been broken away for the purpose of illustrating diagrammatically a clutch 12 adapted to drivingly connect the shafts 14 and 15 in a manner well understood.

The movable portion 16 of the clutch is arranged to be shifted into and out of engagement with the cooperating portion by a clutch collar 18 slidably mounted on the shaft 15, and a coiled spring 17 interposed between an abutment member 19 on the shaft 15 and the collar 18 normally urges the clutch parts into engagement. An arm 20 is secured to a shaft 21 rotatably mounted in and extending transversely of the casing 10 and projecting through one wall of the casing. Secured to the outwardly projecting end of the shaft 21 is an arm 23 having a pin or other projection 24 mounted therein. A pin or roller 25 carried by the arm 20 engages the groove 26 in the clutch collar 18.

It will be observed that by means of the structure thus far described, rotation of the arm 23 in a clockwise direction will serve to shift the clutch collar 18 and the movable element 16 of the clutch to the right against the action of the spring 17, thus discontinuing the drive. This arrangement is merely conventional and has been simplified so far as possible to facilitate an understanding of the principal features of the invention hereinafter referred to.

The clutch pedal 30 provided with a foot engaging portion 31 extends through a slot 33 in the floorboard 34 and is provided with a hub portion 43 mounted for rotation on a supporting shaft 36, the latter being supported in the casing 10 and projecting outwardly thereof. This pedal is normally intended to occupy the position shown in Figure 1 of the drawings, a pad 38 being provided on the underside of the floorboard 34 to definitely limit upward movement of the pedal 30, it being understood that means hereinafter described are provided so that normally a slight clearance is provided between the pedal and the pad. A downwardly extending yoke or arm 40 is formed integrally with the hub portion of the pedal 30 and is connected by link means, indicated generally by the numeral 42, to the arm 23 so that depression of the pedal 30 serves to disengage the cooperating parts of the clutch 12.

Referring now more specifically to Figures 2 and 3 of the drawings, it will be observed that the hub portion 43 of the pedal adjacent the shaft 36 is threaded to receive an adjustable screw threaded member 44 having an enlarged flat head 45 and provided with a slot 46 whereby the bolt may be conveniently adjusted to the left or right, as shown in Figure 2. To ensure retention of the bolt 44 in any position to which it may be adjusted, the hub portion of the pedal is preferably split as indicated at 48, and a bolt 50 is passed through apertures in the split portion for drawing the same together to clamp the bolt 44 firmly in position.

The yoke or arm 40 of the pedal is apertured to receive a pin 54 carried in an ear 55 formed on a sleeve 57 so that this sleeve partakes of the movement of the arm 40. A flange 58 formed on one end of the sleeve 57 is provided with a clutch face 60.

Extending through the sleeve 57 and slidable therein is a second sleeve 62 having a flange 63 on one end thereof provided with a conical clutch face 64 cooperating with the clutch face 60 on the sleeve 57. At its opposite end the sleeve 62 is externally threaded to receive a nut 66, the latter being retained in position by means of a lock nut 67. It will be obvious that the nut 66 forms an abutment for one end of the sleeve 57 and that the sleeves 57 and 62 may slide relatively for the purpose of engaging or disengaging the cooperating clutch faces 60 and 64 formed thereon.

A rod 70 is connected by means of a clevis 72 to the pin 24 on the arm 23, this rod being provided with a threaded portion 71 of relatively steep pitch and extending within and cooperating with corresponding threads formed interiorly of the sleeve 62, the pitch of the threads being such that a reversible connection is provided, that is to say, relative longitudinal movement of the rod 70 and the sleeve 62 will serve to rotate one or the other of these parts. It will be observed that this connection is in the nature of a cam device and need not assume the precise form shown in the drawings. A sheath 75 of leather or similar flexible material is secured at one end to the rod 70 and at the other end to the sleeve 57 and a plug 78 closes the interior of the sleeve 62 adjacent the flanged end thereof so that if desired, the cooperating threaded portions of the rod 70 and the sleeve 62 may be thoroughly lubricated and the lubricant will be retained in the enclosure thus formed.

As shown in Figure 3 of the drawings, the pin 54 is provided with a projecting end 80 having grooves 81 and 82 therein serving respectively to anchor the springs 84 and 85 to the arm 40 of the pedal 30 and to the sleeve 57. The opposite end of the spring 84 is connected to a similar spring anchor projection on the pin 24 and the spring 85 is secured at its opposite end to the pin 21, the latter being mounted in the casing 10. It will be observed that the spring 84 serves to take up any play in the clevis 72 and also serves to urge the sleeve 57 toward the left and into engagement with the stop nut 66 as shown in Figure 2. The spring 85 tends to draw the arm 40 to the left, as shown in Figure 1, to raise the pedal 30 to clutch engaged position. It will, of course, be understood that the usual spring 15 is associated directly with the clutch members to ensure firm gripping engagement between these members, this spring being ordinarily considerably stronger than the spring 84 and being further assisted in urging the clutch members into firm engagement by the spring 85.

In operation, depression of the pedal 30 will result in movement to the right of the link 42 to rock the shaft 21 for releasing the clutch in the usual manner. As the clutch pedal 30 is allowed to return to the position shown in Figure 1 for re-engaging the clutch, the outer portion of the flange 63 on the sleeve 57 engages the enlarged head 45 on the threaded member 44 as the clutch parts engage, the member 44 being adjusted accordingly when the initial installation of the clutch operating parts is made. Since the clutch spring 17 is at this time exerting no force tending to rotate the shaft 21 and move the link 42 to the left, springs 84 and 85 will draw the sleeve 57 to the left into engagement with the stop nut 66 and thus the cooperating clutch faces 60, 64 will be disengaged, the parts occupying the position shown in Figure 2. As the clutch pedal is depressed to release the clutch, counterclockwise movement of the yoke or arm 40 will first shift the sleeve 57 to the right, re-engaging the clutch faces 60, 64, this movement being effected against the action of the springs 84 and 85. Continued downward movement of the pedal 30 will result in movement to the right of the sleeve 62 which is, of course, carried with the sleeve 57. Since the nature of the connection between the arm 55 of the pedal 30 and the sleeve 57 is such that the latter cannot rotate and since the rod 70 cannot rotate by reason of the nature of its connection with the pin 24 on the lever 23, no relative rotation of the parts can take place, the cooperating clutch faces 60, 64 preventing rotation of the sleeve 62.

If it now be assumed that wear has taken place between the cooperating clutch facings, it is obvious that on movement of the pedal 30 toward the position shown in Figure 1, the cooperating clutch parts will not firmly engage when the outer portion of the flange 63 contacts with the head 45 of the bolt 44, but the additional clearance between the cooperating clutch parts will result in the application of force by the clutch spring 17 tending to engage these clutch parts and also tending to move the rod 70, connected thereto, to the left. Thus, when the clutch members 60, 64 have been disengaged by sliding movement of the sleeve 57 to the left under the influence of springs 84 and 85, the sleeve 62 is free to rotate and will be rotated through the threaded connection 71 to permit the rod 70 to move to the left to an extent sufficient to ensure firm engagement of the cooperating clutch parts. When the pedal 30 is again depressed, the usual sequence of operations follows, the sleeve 57 being first moved to the right to engage the clutch members which thereafter carry the link 42 to the right to release the clutch, the sleeve 62 being thus locked against further rotation.

It will be observed that this arrangement ensures the return of the clutch pedal 30 to the position shown in Figure 1 regardless of wear between the clutch facings and prevents the pedal 30 from striking the floorboard when released. The extension of the link 42 is taken care of automatically as the clutch facing wears and it is only necessary to initially set the member 44 to such position as will result in engagement of the flange 63 with the head 45 of this member when the co-operating clutch parts are engaged or are about to be engaged.

Having thus described the invention, what is claimed as new and desired to be secured by Letters Patent is:—

1. In a motor vehicle, the combination with a clutch having a relatively fixed portion and a disengageable movable portion, of an operating member for said clutch having a prescribed range of movement, connections between said operating member and the movable portion of said clutch, and means associated with said connections for automatically altering the range of movement of the movable portion of said clutch to compensate for clutch wear, said means including an extensible tension element forming part of said connections, auxiliary clutch means preventing extension of said tension element, and means carried by said operating member and engaging said auxiliary clutch means to release the latter when the operating member is released.

2. In a motor vehicle, the combination with a clutch having a relatively fixed portion and a disengageable movable portion, of an operating member for said clutch having a prescribed range of movement, connections between said operating member and the movable portion of said clutch, and means associated with said connections for automatically altering the range of movement of the movable portion of said clutch to compensate for clutch wear, said means including an extensible tension element forming part of said connections, auxiliary clutch means preventing extension of said tension element, and means carried by said operating member and engaging said auxiliary clutch means to release the latter when the operating member is released, said last named means comprising a manually adjustable abutment, whereby the point of release of said auxiliary clutch means may be accurately regulated.

3. In a motor vehicle, the combination with a clutch having a relatively fixed portion and a disengageable movable portion, of an operating member for said clutch having a prescribed range of movement, connections between said operating member and the movable portion of said clutch, and means associated with said connections for automatically altering the range of movement of the movable portion of said clutch to compensate for clutch wear, said means including an extensible tension element forming part of said connections, auxiliary clutch means preventing extension of said tension element, and means carried by said operating member and engaging said auxiliary clutch means to release the latter when the operating member is released, said last named means comprising an abutment having an adjustable threaded connection with said operating member, whereby the said auxiliary clutch means may be released at any desired point in the range of movement of said operating member.

4. In apparatus of the class described, the combination with a relatively fixed member, of a movable member, means urging said movable member into engagement with said fixed member, tension means connected to said movable member, an operating means having a predetermined range of movement and associated with said tension means for applying a tension force thereto to shift said movable member away from said fixed member, means for automatically elongating said tension member to compensate for change in the position of engagement of said movable member with said fixed member, said last named means including a clutch associated with said tension device to maintain the effective length of the latter, and means carried by said operating means for releasing said clutch at a predetermined point in the range of movement of said operating means.

5. In a motor vehicle, the combination with a clutch having a relatively fixed portion and a disengageable movable portion, of an operating member for said clutch having a prescribed range of movement, connections between said operating member and the movable portion of said clutch, and means associated with said connections for automatically altering the range of movement of the movable portion of said clutch to compensate for clutch wear, said means including an extensible tension element forming part of said connections, means preventing extension of said tension element, and a member associated with said last named means for releasing the latter when said clutch portions approach engaging position, said last named member being adjustable in position with respect to said last named means to vary the point of release thereof.

6. In a motor vehicle, the combination with a clutch having a relatively fixed portion and a disengageable movable portion, of an operating member for said clutch having a prescribed range of movement, connections between said operating member and the movable portion of said clutch, and means associated with said connections for automatically altering the range of movement of the movable portion of said clutch to compensate for clutch wear, said means including an extensible tension element forming part of said connections, auxiliary clutch means preventing extension of said tension element, and an abutment engaging said auxiliary clutch means to release the latter when the operating member is released, said abutment being adjustable in position with respect to said auxiliary clutch means to vary the instant of release of the latter relative to the instant of engagement of the clutch portions.

7. In a motor vehicle, the combination with a clutch having a relatively fixed portion and a disengageable movable portion, of an operating lever for said clutch having a prescribed range of movement, connections between said operating lever and the movable portion of said clutch, and means associated with said connections for automatically altering the range of movement of the movable portion of said clutch to compensate for clutch wear, said means including an extensible tension element forming part of said connections, means movable with said tension element preventing extension of the latter, and an abutment engageable by said last named means to effect release thereof, said abutment being adjustable in position in the direction of movement of said last named means.

ALFRED MOORHOUSE.